United States Patent [19]

Roggeman et al.

[11] Patent Number: 5,231,152

[45] Date of Patent: * Jul. 27, 1993

[54] CONTINUOUS PROCESS FOR PREPARING COPOLYMERS OF CONJUGATED DIENES AND AROMATIC VINYL COMPOUNDS

[75] Inventors: David M. Roggeman, North Royalton; Jung W. Kang, Clinton, both of Ohio; Takatsugu Hashimoto, Tokyo, Japan

[73] Assignee: Bridgestone Corporation, Tokyo, Japan

[*] Notice: The portion of the term of this patent subsequent to Sep. 15, 2009 has been disclaimed.

[21] Appl. No.: 629,751

[22] Filed: Dec. 18, 1990

[51] Int. Cl.$^5$ .................. C08F 4/46; C08F 236/10

[52] U.S. Cl. .................. 526/173; 526/335; 526/340; 502/157

[58] Field of Search ............. 526/173, 340, 335, 285

[56] References Cited

U.S. PATENT DOCUMENTS

| | | | |
|---|---|---|---|
| 2,560,027 | 7/1951 | Street et al. | 260/83.7 |
| 3,094,512 | 6/1963 | Short | 260/83.7 |
| 3,303,225 | 2/1967 | Hsieh et al. | 260/665 |
| 3,377,404 | 4/1968 | Zelinski | 260/680 |
| 3,640,899 | 2/1972 | Naylor | 252/431 R |
| 3,769,267 | 10/1973 | Cheng et al. | 260/83.7 |
| 3,784,637 | 1/1974 | Farrar | 260/448.2 Q |
| 3,886,127 | 5/1975 | Furukawa et al. | 260/82.1 |
| 3,954,894 | 5/1976 | Kamienski et al. | 260/665 R |
| 3,975,453 | 8/1976 | Smith | 260/655 |
| 3,984,387 | 10/1976 | Lui et al. | 526/74 |
| 4,028,484 | 6/1977 | Morton et al. | 526/335 |
| 4,189,555 | 2/1980 | Massoubre | 526/173 X |
| 4,196,154 | 4/1980 | Tung et al. | 260/665 |
| 4,201,848 | 5/1980 | Kotani et al. | 526/200 X |
| 4,239,863 | 12/1980 | Bredeweg | 525/263 |
| 4,399,078 | 8/1983 | Morrison | 260/665 |
| 4,413,098 | 11/1983 | Hattori et al. | 525/314 |
| 4,421,895 | 12/1983 | Echte et al. | 525/53 |
| 4,433,099 | 2/1984 | Kupper et al. | 525/53 |
| 4,471,093 | 9/1984 | Furukawa et al. | 525/237 |
| 4,497,748 | 2/1985 | Vetus et al. | 260/665 |
| 4,677,165 | 6/1987 | Kikuchi et al. | 525/332.9 |
| 4,713,421 | 12/1987 | Hall et al. | 525/242 |
| 4,748,199 | 5/1988 | Takiguchi et al. | 524/318 |
| 4,782,119 | 11/1988 | Tsutsumi et al. | 525/314 |
| 4,791,178 | 12/1988 | Fujimaki et al. | 525/332.6 |
| 4,822,530 | 4/1989 | Bronstert et al. | 260/665 R |
| 4,835,209 | 5/1987 | Kitagawa et al. | 524/507 |
| 4,859,748 | 8/1989 | Priddy et al. | 526/88 |

OTHER PUBLICATIONS

Rempp et al., Synthesis of Model Macromolecules, Anionic Polymerization, ACS, 1981, 59–70.
Makowski et al., J. Macromol. Sci.-Chem., E2(4), pp. 683–700, Jul. 1968.
Kirk–Othmer, Encyclopedia of Chemical Technology, Third Edition, vol. 8, pp. 618–621.

*Primary Examiner*—Fred Teskin
*Attorney, Agent, or Firm*—Daniel N. Hall

[57] ABSTRACT

A continuous process is described for preparing copolymer compositions of 1,3-conjugated dienes and aromatic vinyl compounds having a weight average molecular weight of greater than about 100,000, and in one embodiment above about 900,000. The process comprises:

(A) continuously introducing into a reactor, a 1,3-conjugated diene, an aromatic vinyl compound, a hydrocarbon solvent and a polymerization catalyst comprising a trimetalated 1-alkyne wherein the catalyst is obtained by reacting at a temperature of above about 70° C., a 1-alkyne containing at least 4 carbon atoms, an organo metallic compound, R°M and a 1,3-conjugated diene wherein the alkyne is characterized by the formula $$RCH_2C{\equiv}CH \tag{II}$$

wherein R is an alkyl group, R° is a hydrocarbyl group, M is an alkali metal, the mole ratio of R°M to 1-alkyne is about 3:1, and the mole ratio of conjugated diene to 1-alkyne is from about 2:1 to about 30:1;

(B) continuously agitating the contents of the reactor while effecting the polymerization reaction to form the copolymer; and (C) continuously withdrawing the copolymer from the reactor. The invention also relates to the copolymers thus prepared.

22 Claims, 1 Drawing Sheet

CONTINUOUS PROCESS FOR PREPARING COPOLYMERS OF CONJUGATED DIENES AND AROMATIC VINYL COMPOUNDS

TECHNICAL FIELD OF THE INVENTION

This invention relates to a continuous process for preparing copolymers of conjugated dienes such as 1,3-butadiene and aromatic vinyl compounds such as styrenes. More particularly, this invention relates to such process which uses a trimetalated 1-alkyne catalyst. The invention also relates to the copolymers thus prepared.

BACKGROUND OF THE INVENTION

The polymerization of conjugated dienes such as 1,3-conjugated dienes to form elastomeric homopolymers and copolymers utilizing various initiator systems is known. For example, such polymerizations can be initiated with organometallic compounds wherein the metal is a Group I metal such as lithium. These polymers and copolymers of conjugated dienes are useful for tire rubbers, molded rubber goods, molding compounds, surface coatings, etc.

Various organometallic compounds have been described in the literature as useful in the polymerization and copolymerization of conjugated dienes. Among the catalysts which have been proposed are various alkali metal acetylides. For example, U.S. Pat. No. 3,303,225 describes the use of metalated 1-acetylenes as active catalysts in the polymerization of vinylidene-containing monomers. Alkali metal acetylides are prepared by reacting an organo alkali metal compound with an acetylene under conditions to effect step-wise replacement of, first, the acetylenic hydrogen atom, and, second, the hydrogen atoms attached to the carbon atom which is alpha to the acetylenic linkage.

The stereopolymerization of butadiene and styrene in the presence of acetylenes and ketones is described by H. E. Adams et al, in Kautschuk und Gummi.Kunststoffe 18. Jahrgang, pp. 709-716, Nr, 11/1965. The authors studied the reaction of 1-butyne with 1,2 and 3 moles of n-butyllithium in hexane, and the use of the materials obtained from such reactions as catalysts. The reaction of 1-butyne with one mole of n-butyllithium resulted in the formation of a white precipitate where the acetylenic hydrogen was replaced by lithium. When a second mole of n-butyllithium was added slowly to the reaction mixture, the white precipitate dissolves and the product is a clear lemon-yellow solution. Upon standing at room temperature, the solution becomes cloudy, and after about 210 hours, the precipitation of a yellow solid is complete. The product was identified as 1,3-dilithio-1-butyne. When an excess of n-butyllithium is added to the precipitate of 1,3-dilithio-1-butyne, the precipitate dissolves to form a golden-yellow solution. There were signs of precipitation after two weeks, and after two months, a copious precipitate had formed. The precipitate is identified as a complex of 1,3-dilithio-1-butyne and n-butyllithium.

The use of dilithium salts in the polymerization of butadiene is reported by Makowski et al, *J. Macromol. Sci.—Chem.*, E2(4) pp. 683-700, July, 1968. Among the lithium compounds studied were the 1,3-dilithioacetylides such as the compounds obtained by reacting 1-hexyne with n-butyllithium in ratios of 0.5 and 0.67. At a ratio of 0.5, homogeneous catalyst solutions in hydrocarbons were obtained. Above this ratio, some precipitate was present. In all cases, however, polymerization with butadiene resulted in low molecular weight polymer solutions. That is, where the catalyst solution included precipitated solids, the solids dissolved during the course of the polymerization. At the ratio of 0.5, the polymer solution was very viscous, and at the ratio of 0.67 a gelled solution resulted. However, when Attapulgus clay was added to the viscous solution or to the gelled solution, fluid solutions were obtained. This result was attributed to the presence of water in the clay.

Polylithium polymerization initiators also are described in U.S. Pat. No. 3,377,404. The initiators are prepared by first contacting an excess of lithium with an organic halide containing two to four halogen atoms in a polar solvent such as ether. The intermediate formed in this step can be represented by the formula wherein x is an integer of two to four and R is a hydrocarbon group. In a second step, the intermediate is contacted with a small amount of a conjugated diene such as 1,3-butadiene. The amount of diene is generally from about one to about ten moles per mole of lithium compound. After the intermediate has been treated in this manner, a substantial amount or all of the polar solvent is removed and replaced by a hydrocarbon solvent. The polylithiated hydrocarbon soluble compounds prepared in this manner are reported to be useful as initiators of the polymerization of conjugated dienes including the polymerization of a mixture of a conjugated diene and other monomers such as vinyl-substituted aromatic compounds.

U.S. Pat. No. 3,784,637 describes multi-functional polymerization initiators prepared from polyvinylsilane compounds or polyvinylphosphine compounds. More particularly, the multi-functional polymerization initiators are prepared by reacting an organomonolithium compound such as n-butyllithium with a polyvinyl phosphine compound or polyvinylsilane compound. Preferably, the reaction is conducted in the presence of a solubilizing monomer such as a polymerizable conjugated diene, monovinyl-substituted aromatic compound, or mixtures thereof. Examples of solubilizing monomers include conjugated dienes such as 1,3-butadiene and aromatic vinyl compounds such as styrene.

Elastomer compositions comprising a blend of styrene butadiene rubbers are described in U.S. Pat. No. 4,471,093. The blends which are useful in tire tread compounds comprise a mixture of a high molecular weight styrene-butadiene rubber having a specific microstructure and a low molecular weight styrene-butadiene and/or butadiene rubber. The high molecular weight styrene-butadiene rubber component is further characterized as having a styrene content of 15-35% by weight, a 1,2-bond content in the butadiene component of 40 to 70 mole percent, and an intrinsic viscosity of 2.0 to 6.0 in toluene at 30° C. The ratio of the weight average molecular weight to the number average molecular weight is defined as being not more than 2.0.

U.S. Pat. No. 2,560,027 describes a continuous process for polymerizing butadiene and styrene in aqueous systems containing an emulsifying agent and a polymerization catalyst. The reactants are introduced into the reactor at a constant rate to produce a polymerization conversion in the range of 60 to 70%, and a dispersion is continuously withdrawn from the reactor which contains the desired polymerized butadiene and styrene and unreacted monomers. The unreacted monomers can be removed by evaporation.

U.S. Pat. No. 4,433,099 describes impact-resistant modified styrene polymers which are produced by continuously polymerizing the styrene solution of a polybutadiene by means of a cascade consisting of at least three continuous stirred tank reactors at rising temperatures and in the presence of organic peroxide initiators.

U.S. Pat. No. 4,782,119 describes rubber compositions containing at least 28% by weight of a styrene-butadiene block copolymer consisting of a block (A) and a block (B) wherein the block (A) is a styrene-butadiene copolymer block having a content of styrene of 10-80% by weight and the average content of the vinyl bonds in the butadiene portion of 30-70% by weight, and the block (B) is a polybutadiene block with the average content of the vinyl bonds in the butadiene portion being not more than 60% by weight. The styrene-butadiene block copolymers can be obtained according to a continuous polymerization method using an organolithium initiator in the presence of a polar compound such as an ether compound or a tertiary amine compound. The organic lithium initiator utilized in the examples is n-butyllithium.

Solution copolymerization of styrene and butadiene also is discussed in Kirk-Othmer, *Encyclopedia of Chemical Technology*, Third Edition, Vol. 8, pp. 618-. Reference to continuous processes for preparing styrene butadiene rubbers is found at pp. 620-21.

SUMMARY OF THE INVENTION

A continuous process is described for preparing copolymer compositions of 1,3-conjugated dienes and aromatic vinyl compounds having a weight average molecular weight of greater than about 100,000, and in one embodiment above about 900,000. The process comprises:

(A) continuously introducing into a reactor, a 1,3-conjugated diene, an aromatic vinyl compound, a hydrocarbon solvent and a polymerization catalyst comprising a trimetalated 1-alkyne wherein the catalyst is obtained by reacting at a temperature of above about 70° C., a 1-alkyne containing at least 4 carbon atoms, an organo metallic compound, R°M and a 1,3-conjugated diene wherein the alkyne is characterized by the formula $$RCH_2C\equiv CH \qquad (II)$$

wherein R is an alkyl group, R° is a hydrocarbyl group, M is an alkali metal, the mole ratio of R°M to 1-alkyne is about 3:1, and the mole ratio of conjugated diene to 1-alkyne is from about 2:1 to about 30:1;

(B) continuously agitating the contents of the reactor while effecting the polymerization reaction to form the copolymer; and (C) continuously withdrawing the copolymer from the reactor. The invention also relates to the copolymers thus prepared.

DESCRIPTION OF THE PREFERRED EMBODIMENTS

In one embodiment of the present invention, the continuous process of the present invention comprises continuously and separately introducing into a reactor, a 1,3-conjugated diene, an aromatic vinyl compound, an aromatic hydrocarbon solvent and a polymerization catalyst which is a trimetalated 1-alkyne as described more fully below. As each of the above components is continuously introduced into the reactor, the contents of the reactor are continuously mixed by agitation and the polymerization reaction begins. Since the polymerization reaction is exothermic, the temperature of the mixture within the reactor increases from ambient temperature when the components are introduced at ambient temperature. The temperature of the mixture within the vessel may be controlled by applying external heat when it is desired to raise the temperature of the mixture, or by cooling if necessary to lower or maintain a given temperature. Generally, the polymerization reactions will occur within the reactor at temperatures of between about 30° C. and about 150° C., and more often, the temperature within the reactor will be maintained at between about 80° C. to about 125° C. When the mixture comprising the monomers, hydrocarbon solvent, and polymerization catalysts has been in the reactor for the desired period of time to effect the polymerization reaction (residence time), the copolymer thus formed and hydrocarbon solvent are continuously withdrawn from the reactor. The copolymer and hydrocarbon solvent are withdrawn at a rate which is substantially equal to the rate of introduction of the monomer, hydrocarbon solvent and catalyst into the reactor. Residence times of from about 20 minutes to about one hour at temperatures of 100° C. to 125° C. are generally sufficient to effect polymerization and substantially 100% conversion of the desired copolymers. The residence time for effecting the desired continuous process for preparing the copolymers is dependent upon such factors as the types and concentrations of the monomers and the catalysts, the temperature within the reactor, etc., and optimum residence time for a particular reaction can be readily determined by one skilled in the art.

Figure 1:
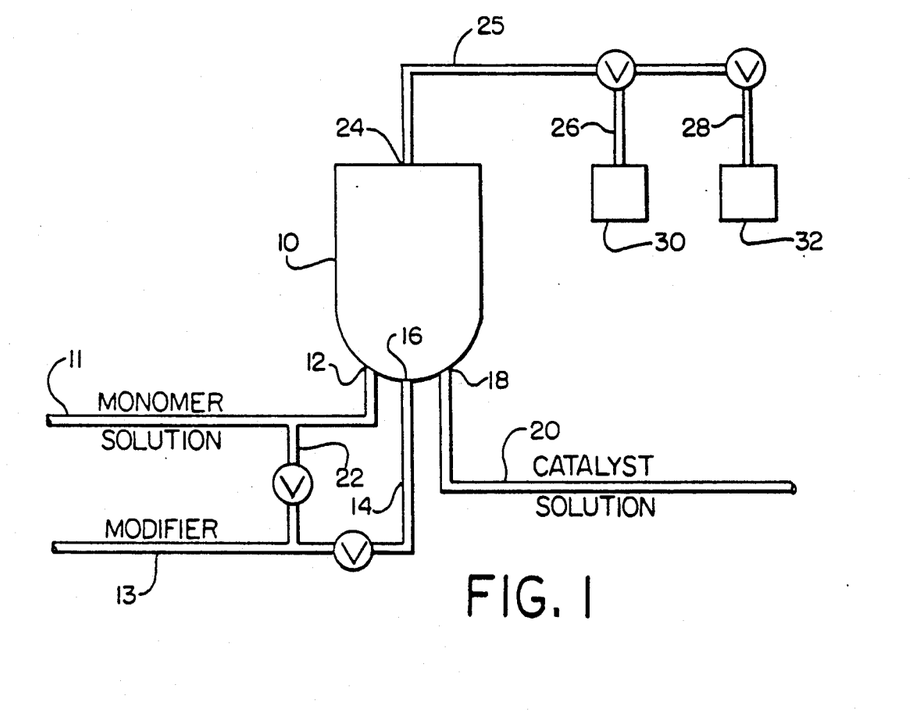
FIG. 1 is a diagrammatical view of a reactor for carrying out the continuous process of the invention.

Another embodiment is illustrated in FIG. 1 which is a diagrammatical view of a reactor for carrying out the continuous process of the present invention. In the embodiment illustrated in FIG. 1, a monomer solution comprising a 1,3-conjugated diene and an aromatic vinyl compound dissolved in a hydrocarbon solvent is continuously introduced into reactor 10 at inlet 12 through conduit 11, and a catalyst solution comprising the polymerization catalyst dissolved in a hydrocarbon solvent is introduced into the reactor 10 at inlet 18 through conduit 20. When it is desired to introduce a modifier such as the modifiers described more fully below, into the reactor, the modifier may be introduced at inlet 16 through conduit 10, generally as a solution in a hydrocarbon solvent. Alternatively, the modifier may be introduced into the monomer solution just prior to the introduction of the monomer solution into the reactor 10 by way of conduit 22 through proper adjustment of the two valves (V). The reactor 10 is equipped with means for agitating (not shown) the contents of the reactor as the polymerization reaction occurs within the reactor. The copolymer which is formed, and the hydrocarbon solvent (and any unreacted components and- /or by-products) are continuously withdrawn from reactor 10 at exit 24 through conduit 25 and introduced to storage tanks 30 and 32 through conduits 26 and 28, respectively.

The copolymer compositions formed by the continuous process of the present invention are copolymers of a 1,3-conjugated diene monomer and an aromatic vinyl monomer. The relative amount of conjugated diene and aromatic vinyl monomers included in the copolymers may be varied over a wide range depending upon the desired copolymer properties. Thus, the amount of conjugated diene in the copolymer may vary from 10 to about 90% by weight and the amount of aromatic vinyl compound from about 10 to about 90% by weight. More generally, the copolymers will comprise from about 50 to about 90%, preferably from about 50 to about 80% by weight of the conjugated diene and from about 10 to about 50% by weight, more preferably from about 20 to about 50% by weight of the aromatic vinyl compound.

Monomers

The conjugated diene monomers useful in the process of this invention generally are 1,3-dienes, and they contain from 4 to 12 carbon atoms and preferably from 4 to 8 carbon atoms per molecule. Examples of these dienes include the following: 1,3-butadiene, isoprene, 2,3-dimethyl-1,3-butadiene, 1,3-pentadiene (piperylene), 2-methyl-3-ethyl-1,3-butadiene, 3-methyl-1,3-pentadiene, 2-ethyl-1,3-pentadiene, 1,3-hexadiene, 2-methyl-1,3-hexadiene, 1,3-heptadiene, 3-methyl-1,3-heptadiene, 1,3-octadiene, 3-butyl-1,3-octadiene, 3,4-dimethyl-1,3-hexadiene, 3-n-propyl-1,3-pentadiene, 4,5-diethyl-1,3-butadiene, 2,3-di-n-propyl-1,3-butadiene, 2-methyl-3-isopropyl-1,3-butadiene, and the like. Among the dialkyl butadienes, it is preferred that the alkyl groups contain from 1 to 3 carbon atoms. Conjugated dienes containing alkoxy substituents along the chain can also be employed, such as 2-methoxy-1,3-butadiene, 2-ethoxy-3-ethyl-1,3-butadiene, The aromatic vinyl compounds include styrene, 1-vinyl-naphthalene, 2-vinylnaphthalene, and alkyl, cycloalkyl, aryl, alkaryl, aralkyl, alkoxy, aryloxy, and dialkylamino derivatives thereof in which the total number of carbon atoms in the combined substituents is generally not greater than 12. Examples of these aromatic monomers include p-methylstyrene, alpha-methylstyrene, 3,5-diethylstyrene, 4-n-propylstyrene, 2,4,6-trimethylstyrene, 4-dodecylstyrene, 3-methyl-5-n-hexylstyrene, 4-cyclohexylstyrene, 4-phenylstyrene, 2-ethyl-4benzylstyrene, 4-p-tolylstyrene, 2,3,4,5-tetramethylstyrene, 4-(4-phenyl-n-butyl)styrene, 3-(4-n-hexylphenyl)styrene, 4-methoxystyrene, 3,5-diphenoxystyrene, 2,6-dimethyl-4-hexoxystyrene, 4-dimethylaminostyrene, 3,5-diethylaminostyrene, 4-methoxy-6-di-n-propylaminostyrene, 4,5-dimethyl-1-vinylnaphthalene, 3-ethyl-1-vinylnaphthalene, 6-isopropyl-1-vinyl-naphthalene, 2,4-diisopropyl-1-vinyl-naphthalene, 3,4,5,6-tetramethyl-1-vinylnaphthalene, 3,6-di-n-hexyl-1-vinyl-naphthalene, 8-phenyl-1-vinyl-naphthalene, 5-(2,4,6-trimethylphenyl)-1-vinylnaphthalene, 3,6-diethyl-2-vinylnaphthalene, 7-dodecyl-2-vinylnaphthalene, 4-n-propyl-5-n-butyl-2-vinylnaphthalene, 6-benzyl-2-vinylnaphthalene, 3-methyl-5,6-diethyl-8-n-propyl-2-vinyl-naphthalene, 4-p-tolyl-2-vinylnaphthalene, 5-(3-phenyl-n-propyl)-2-vinylnaphthalene, 4-methoxy-1-vinylnaphthalene, 6-phenoxyl-1-vinylnaphthalene, 3,6-dimethylamino-1-vinylnaphthalene, and the like. Other examples of vinyl substituted aromatic compounds are found in U.S. Pat. No. 3,377,404, the disclosure with respect to which is incorporated herein by reference. Preferred aromatic vinyl compounds include the styrenes, particularly, styrene.

Preferred copolymers are those obtained from 1,3-butadiene, isoprene or piperylene with styrene. More particularly, copolymers of 1,3-butadiene and styrene are preferred.

Catalyst

In one embodiment, the ultra high molecular weight copolymers of the present invention are obtained by polymerizing a 1,3-conjugated diene and an aromatic vinyl compound in the presence of a catalyst which is a trimetalated 1-alkyne. The trimetalated 1-alkyne catalysts are characterized by the formula (I)

wherein R is a hydrocarbyl group, M is an alkali metal, $R^1$ is a divalent oligomeric hydrocarbyl group comprising moieties derived from a 1,3-conjugated diene, and the total number moieties derived from a 1,3-conjugated diene in all of the $R^1$ groups in Formula I is from about 2 to about 30.

The hydrocarbyl group R may be a saturated aliphatic, saturated cycloaliphatic or an aromatic group generally containing up to about 20 carbon atoms. In one embodiment, R is an alkyl group containing from 1 to 15 carbon atoms. In another embodiment, R is an alkyl group containing 1 to 6 carbon atoms. In a further embodiment, R is an alkyl group containing from about 3 to about 9 carbon atoms. M is an alkali metal including lithium, sodium, potassium, rubidium, cesium and francium. Lithium, sodium and potassium are preferred alkali metals, and lithium is the most preferred alkali metal.

The substituent $R^1$ is a divalent oligomeric hydrocarbyl group comprising moieties derived from a 1,3-conjugated diene. The conjugated dienes may be any of a variety of 1,3-conjugated dienes including those containing from 4 to 12 carbon atoms, and preferably from 4 to 8 carbon atoms per molecule. Specific examples of the conjugated dienes include: 1,3-butadiene; isoprene; 2,3-dimethyl-1,3-butadiene; 1,3-pentadiene(piperylene); 2-methyl-3-ethyl-1,3-butadiene; 3-methyl-1,3-pentadiene; 1,3-hexadiene; 2-methyl-1,3-hexadiene; 1,3-heptadiene; 1,3-octadiene; etc. In one preferred embodiment, the moieties of the oligomeric group $R^1$ are derived from 1,3-butadiene, isoprene or piperylene.

The number of moieties derived from a conjugated diene in the $R^1$ groups of the composition of Formula I may be varied over a range of from 2 to about 30. Generally, the total number of moieties derived from a conjugated diene in the two $R^1$ groups in the composition of Formula I is from about 3 to about 30. In one preferred embodiment, the total number of conjugated diene derived moieties in all of the $R^1$ groups in the composition of Formula I is from about 8 to about 20. The number of moieties derived from a conjugated diene in the oligomeric groups $R^1$ can be varied to provide compositions of Formula I having a weight average molecular weight of from about 200 to about 3000.

In one preferred embodiment, the weight average molecular weight of the compositions of Formula I is within a range of from about 800 to about 2000. The hydrocarbon-soluble trimetalated 1-alkyne compositions characterized by Formula I can be obtained by reacting a 1-alkyne, an organometallic compound R°M, and a conjugated diene at a temperature above about 70° C., wherein the mole ratio of R°M to 1-alkyne is about 3:1. The 1-alkyne may be represented by the formula $$RCH_2C \equiv CH \qquad (II)$$

wherein R is a hydrocarbyl group. Representative examples of such 1-alkyne compounds which contain at least 4 carbon atoms include 1-butyne; 1-hexyne; 1-octyne; 1-decyne, 1dodecyne; 1-hexadecyne; 1-octadecyne; 3-methyl-1-butyne; 3-methyl-1-pentyne; 3-ethyl-1-pentyne; 3-propyl-6-methyl-1-heptyne; 3-cyclopentyl-1-propyne; etc.

The organometallic compound may be represented by the formula R°M wherein R° is a hydrocarbyl group which may be a saturated aliphatic group, a saturated cycloaliphatic group, or an aromatic group. Generally, R° will contain up to about 20 carbon atoms. M is an alkali metal including lithium, sodium, potassium, rubidium, cesium and francium. Representative examples of the organometallic compound R°M include: methylsodium, ethyllithium; propyllithium; isopropylpotassium, n-butyllithium, s-butyllithium; t-butylpotassium; t-butyllithium; pentyllithium; n-amylrubidium; tert-octylcesium; phenyllithium; naphthyllithium; etc. The conjugated dienes which are reacted with the intermediate to form the desired compositions are preferably 1,3-conjugated dienes of the type which have been described above.

In a preferred embodiment, the trimetalated 1-alkyne compositions of the present invention are prepared by the method which comprises the steps of
(a) reacting a 1-alkyne with an organometallic compound R°M in a mole ratio of about 1:3 to form an intermediate, and
(b) reacting said intermediate with a conjugated diene at a temperature of at least about 70° C. The mole ratio of conjugated diene to 1-alkyne in the reaction is at least about 2:1 and may be as high as about 30:1. More generally, the ratio will be in the range of from about 8:1 to 20:1.

The reaction of the 1-alkyne with the organometallic compound followed by reaction with the conjugated diene can be carried out in the presence of an inert diluent, and particularly, in the presence of a hydrocarbon such as an aliphatic, cycloaliphatic or aromatic hydrocarbon. Representative examples of suitable hydrocarbon diluents include n-butane, n-hexane, isooctane, decane, dodecane, cyclohexane, methylcyclohexane, benzene, toluene, xylene, etc. Preferred hydrocarbons are aliphatic hydrocarbons containing from four to about 10 carbon atoms per molecule. Mixtures of hydrocarbons can also be utilized.

The reaction between the 1-alkyne and the organometallic compound to form the intermediate can be effected at temperatures of 20°-30° C., and the reaction is generally conducted in an inert atmosphere such as under nitrogen. The reaction generally is conducted at atmospheric pressure. The intermediate obtained from the first step is a trimetalated alkyne which is either insoluble or only slightly soluble in hydrocarbons.

The reaction between the intermediate and the conjugated diene to form a hydrocarbon soluble product is conducted at a temperature above 70° C. and more generally at a temperature of from about 70° C. to about 150° C. The reaction generally is completed in less than about 5 hours, and the reaction results in a change in the color of the solution from a yellow to red or reddish brown. At about 80° C. the reaction is completed in about 3 hours. At higher temperatures, the reaction is completed in less than 3 hours. If the reaction mixture is heated for too long a period, the catalytic activity of the resulting product may be reduced. The product of this reaction is a trimetalated alkyne containing two divalent oligomeric hydrocarbyl groups comprising moieties derived from the conjugated diene. Relatively small amounts of the conjugated diene are reacted with the intermediate in the second step. The mole ratio of conjugated diene to 1-alkyne in the intermediate is at least about 2:1 and may be as high as 30:1. In one preferred embodiment, the mole ratio of conjugated diene to 1-alkyne is in a range of from about 8:1 to about 20:1.

The trimetalated compounds used in this invention contain active as well as inactive metal. The presence of at least two different types of carbon metal linkages in the compositions of this invention can be shown by both chemical and physical evidence. Gilman titration with allyl bromide distinguishes between metal acetylide ($—C \equiv C—M$) which is inactive and other carbon lithium linkages ($—C—C—M$) which are active, *J. Organimetal Chem.*, 1(1963) 8. Titration of the compositions of this invention show about 67% of the total carbon-metal linkages are "active" corresponding to trimetalated alkynes. Ultraviolet and visible spectral studies show peak absorbances at 300–340 NM and 400–450 NM for the compositions of this invention corresponding to inactive and active metal linkages, respectively.

An important property of these catalyst compositions is that they are soluble in hydrocarbon solvents. The terms "soluble in hydrocarbon solvent" and "hydrocarbon soluble" as used in the specification and claims, indicate that the materials (polymers) are soluble in hydrocarbons, particularly aliphatic hydrocarbons such as n-hexane, to the extent of at least about 5 grams of material per 100 grams of solvent at about 25° C. The solutions are stable in an inert atmosphere at room temperature for an extended period of time.

The following examples illustrate the preparation of the hydrocarbon soluble trimetalated 1-alkyne compositions useful as catalysts in the present invention. Additional examples of useful catalysts are found in pending U.S. application Ser. No. 07/586,058, filed Sep. 21, 1990; Inventors J. W. Kang, G. B. Seavers, and T. Hashimoto. The disclosure of this pending application is hereby incorporated by reference for its description of additional catalysts.

Unless otherwise indicated in the following examples and elsewhere in the specification and claims, all parts and percentages are by weight, temperatures are in degrees centigrade and pressure is at or near atmospheric pressure.

EXAMPLE A

To a solution of 0.55 ml. of 1-octyne (3.73 mM) in dry hexane contained in a 7-ounce bottle equipped with rubber liner and three-hole crown cap are charged 7 ml. of n-butyllithium (11.2 mM, 1.6M solution) through a disposable syringe at room temperature under nitrogen. The resulting slurry is shaken vigorously to complete the reaction, and the resulting pale yellow solution is allowed to stand at room temperature for one hour. To this solution is charged 25 gms. of 1,3-butadiene in hexane (24.2% butadiene, 112 mM butadiene). The mixture is tumbled in a bath heated to about 80° C. for three hours, and the resulting reddish brown solution is cooled and stored. Analysis of the solution obtained in this manner by the Gilman technique indicates active carbon-lithium linkage of 63.6%. The calculated active carbon-lithium linkage based on 1,3,3-trilithio-octyne is 66.7%.

EXAMPLE B

To a one-gallon reactor equipped with thermometer, stirrer, heating means, pressure means, inlet and outlet ports are charged 450 gms, of dry hexane, 436 gms. (1008 mM) of n-butyllithium (1.54M) in hexane, and a solution of 37 gms. (336.3 mM) of 1-octyne in 35 gms. of dry hexane. The reaction mixture is maintained under a nitrogen atmosphere as the n-butyllithium and octyne are added to the reactor. After the above ingredients are added to the reactor, the mixture is stirred at room temperature for 30 minutes under nitrogen, and 816.5 gms. of a 1,3-butadiene/hexane blend containing 200 gms. of 1,3-butadiene are added to the reactor. This mixture is stirred at 85° C. for 120 minutes whereupon a homogeneous reddish-brown solution is obtained. This solution is allowed to cool to room temperature and transferred to storage tank under a nitrogen atmosphere. The solution contains the hydrocarbon-soluble trilithiated 1-alkyne diene-treated catalyst useful in this invention. Gilman's titration indicates the presence of 62.34% active carbon-lithium linkages at 0.2628 molarity. The calculated active carbon-lithium linkage is 66.7%.

Two-hundred grams of the catalyst solution is coagulated with excess methanol in the presence of an antioxidant (e.g., 1% di-tertiary-butyl para cresol). The resulting oily product is dried at 50° C. under vacuum. Gel permeation chromatography analysis of the product indicates a 1123 Mw.

Polymerization

The copolymers of the present invention are prepared by polymerizing the conjugated diene and the vinyl aromatic compound in a hydrocarbon solvent in the presence of the above-described trimetalated 1-alkyne catalyst in a continuous process as described above. The polymerization temperature may range from about 30° C. to about 150° C. or higher, but generally, the polymerization is conducted at a temperature of between about 75° C. and 150° C. for a period of from about 10 minutes to about one hour. In a preferred embodiment, the polymerization is conducted at a temperature in the range of about 80° C. to about 125° C. for a period of about 15 minutes to one hour. The desired copolymers can be obtained consistently with about 100% conversion at these relatively high temperatures in a relatively short period of time. The copolymers may be random or block copolymers, but random copolymers are preferred. The actual temperature utilized in the polymerization reaction will depend upon the desired polymerization rate, the product desired, and the particular catalyst or catalyst system utilized. The usual precautions are taken to exclude materials such as water and air that will inactivate or poison the catalyst.

Hydrocarbon Solvent

The contiuous polymerization reaction is conducted in a hydrocarbon solvent or diluent. As mentioned above, the monomers and the catalyst are generally introduced into the reactor as solutions in a hydrocarbon solvent. Various hydrocarbon solvents can be used including aliphatic, cycloaliphatic and aromatic hydrocarbons. In one embodiment, aliphatic hydrocarbons such as hexane and cyclohexane are preferred. Examples of the aliphatic hydrocarbons useful as solvent/diluent in the polymerization reaction generally will contain from about 3 to about 20 carbon atoms, and more preferably from about 5 to about 10 carbon atoms. Examples of such aliphatic hydrocarbons include butane, pentane, hexane, heptane, octane, decane, etc. Cycloalkanes containing from 5 to 20 and preferably from 5 to about 10 carbon atoms also are useful. Examples of such cycloalkanes include cyclopentane, cyclohexane, methyl cyclohexane, and cycloheptane. Aromatic solvents which may be utilized include benzene, toluene and xylene. Individual solvents can be employed, or combinations of hydrocarbons such as a hydrocarbon distillate fraction may be utilized.

Modifiers

Various compositions, referred to in the art as modifier compositions, can be included in the copolymerization mixture to increase the amount of 1,2-structure in the copolymers. Any of the modified compositions which have been described in the prior art which will combine with the trimetalated 1-alkyne catalyst of the present invention to produce ultra high molecular weight copolymers having increased amounts of 1,2-structure can be utilized in the method of the present invention. Modifier compounds which have been found to be particularly useful in combination with the trimetalated 1-alkyne catalyst of the present invention are those selected from the group consisting of linear and cyclic oligomeric oxolanyl alkanes. These types of modified compounds are described in U.S. Pat. No. 4,429,091, and the disclosure of U.S. Pat. No. 4,429,091 relating to such modified compositions, particularly the disclosure in Cols. 3 and 4, is hereby incorporated by reference. The oxolanyl modifiers can be prepared, for example, by reacting furan which is unsubstituted in either or both of the 2- or 5- positions, with either an aldehyde or a ketone (e.g., acetone) in the presence of an acid such as hydrochloric acid. Control of the reaction parameters results in the production of a product containing up to 95% of dimers, trimers and tetramers. Once the linear oligomers or cyclic structures are formed, these reaction products are hydrogenated in the presence of suitable hydrogenation catalysts such as nickel base catalysts to produce the desired oxolanyl compounds.

Examples of oligomeric modifiers for use with the trimethylated 1-alkyne catalysts of the present invention include: bis(2-oxolanyl) methane; 2,2-bis(2-oxolanyl) propane; 1,1-bis(2-oxolanyl) ethane; 2,2-bis(2-oxolanyl) butane; 2,2-bis(5-methyl-2-oxolanyl) propane; and 2,2-bis(3,4,5-trimethyl-2-oxolanyl) propane.

The molar ratio of the modifier to the trimetalated 1-alkyne catalyst (as active lithium) can vary from about 1:20 to about 20:1, more often from about 1:10 to 10:1. In one preferred embodiment, the molar ratio is from about 0.1:1 to about 1.5 or 2.0.

Other materials useful as modifiers in the process of this invention include Lewis bases which may be, for example, ethers or tertiary amines. Specific examples of such modifiers include diethyl ether, dibutyl ether, tetrahydrofuran, 2-methoxytetrahydrofuran, 2-methoxymethyltetrahydrofuran, 2,2'-di(tetrahydrofuryl) propane, ethyleneglycol dimethylether, ethyleneglycol diethylether, ethyleneglycol dibutylether and the like; triethylamine, 1,2-dipiperidinoethane, pyridine, N,N,N',N'-tetramethylethylenediamine, N,N,N',N'-tetraethylenediamine, N-methylmorpholine, triethylenediamine, tripiperidinophosphine oxide and the like.

The modifiers can be introduced directly and continuously into the reactor, or the modifier can be introduced into the monomer solution prior to the introduction of the monomer solution into the reactor. The modifiers are generally introduced, in either situation, as a dilute solution in a hydrocarbon solvent.

The amounts of trimetalated 1-alkyne catalyst and the optional modifier(s) utilized in the continuous process of this invention are amounts designed to result in the formation of the copolymer of the present invention having the desired properties. The amounts utilized in a particular copolymerization reaction will depend upon a number of factors including the types and amounts of monomers being copolymerized, the desired copolymer molecular weight and molecular weight distribution, etc. One of the desirable features of the catalyst used in the continuous method of the invention is that only small amounts of the catalysts are required to produce the desired copolymer, and this results in a cost savings.

The amount of the catalyst which is employed in the preparation of the copolymers of the present invention is expressed as the number of grams of active metal in the catalysts based on metal per 100 grams of monomer (PHGM). In the trimetalated 1-alkyne catalyst of the present invention wherein the metals are in the 1,3,3-positions, the metal in the 1-position is inactive whereas the metals in the 3-position are active metals. Generally, the grams of active metal PHGM may range from about 0.001 to about 0.01. At the hither amounts, the weight average molecular weight of the copolymers of the present invention tends to decrease. In another embodiment, the grams of active metal PHGM will range from about 0.002 to 0.008, and in yet another embodiment, the ratio is from about 0.004 to 0.006.

The term 1,2-units or 1,2-microstructure as used in the present application refers to the mode of addition of a growing polymer chain with a conjugated diene monomer unit. Either 1,2-addition or 1,4-addition can occur. In terms of nomenclature, this results in a 1,2-unit or microstructure for the monomer unit in the polymer chain when 1,3-butadiene is a monomer. When isoprene is the monomer, 3,4-microstructure most generally results with a smaller amount of 1,2-microstructure in the polymer chain. Naming of the polymer structure which results from 1,2-addition is thus dependent on the monomers being polymerized. For simplicity, the term 1,2-unit or 1,2-microstructure is employed to determine the microstructure which results from 1,2-addition of conjugated dienes. The microstructure of the ultra high molecular weight copolymers of the present invention is determined using proton NMR. The copolymers of this invention can be prepared containing relatively high amounts of 1,2 units (vinyl) such as from 30 to 80% by weight of 1,2 units.

When the polymerization reaction has progressed to the desired degree, the product (copolymer, solvent and some unreacted monomer) is recovered from the reactor and can be combined with an alcohol such as methanol or isopropanol, or other liquid medium which deactivates the initiator and coagulates and precipitates the polymer product. Generally, an amount of isopropanol equal in weight to the amount of solvent (e.g., hexane) used is sufficient to effect coagulation and precipitation. It is also customary and advantageous to include an antioxidant such as about 1% of di-tertiary butyl-paracresol in the isopropanol. The copolymer is recovered and dried to remove solvent.

Since the initially formed and unquenched polymer solutions obtained in accordance with the method of the invention contain terminal metal atoms (e.g., lithium atoms) on the polymer molecules, the unquenched polymer solutions can be treated with various reagents to introduce functional groups by replacing the terminal metal atoms. For example, the unquenched copolymer solutions can be treated with various reagents to introduce terminal functional groups such as —SH, —OH, —COOH, halogen, etc. Carboxyl groups can be introduced by treating the unquenched solution with carbon dioxide, and hydroxy groups can be introduced by treating the unquenched polymer solution with epoxy compounds. The procedures for introducing such groups into the unquenched copolymer solutions containing terminal metal atoms are well known to those skilled in the art.

The copolymers obtained by the process of the present invention generally have weight average molecular weights of about 200,000 and higher. In one embodiment, the copolymers the present invention are of the type generally referred to as ultra high molecular weight copolymer compositions. The ultra high molecular weight copolymer compositions obtained in accordance with the present invention are essentially free of gel and are further characterized as having a weight average molecular weight of greater than about 900,000. Ultra high molecular weight copolymer compositions can be prepared by the continuous method of the present invention having a weight average molecular weight of greater than 1,100,000. Other characterizing features of the ultra high molecular weight copolymers include inherent viscosity, dilute solution viscosity and percent relaxation as determined using a Mooney viscometer. In one embodiment, the copolymer compositions prepared by the continuous process of the present invention are characterized as having an intrinsic viscosity ($\eta$) in tetrahydrofuran of at least 4.0, and in another embodiment, the copolymers have an intrinsic viscosity in tetrahydrofuran of at least about 4.5.

The copolymers prepared by the process of the invention may also be characterized in terms of percent relaxation as determined by a procedure which will be discussed more fully below. In one embodiment, the copolymers having a weight average molecular weight of about 900,000 and higher are characterized by percent relaxation values of at least about 30% to 100%, and more particularly relaxations of from about 30% to about 70%, and a $T_{80}$ (seconds) value as described more fully below of abouat 300 or higher.

The ultra high molecular weight compositions of the present invention also may be characterized as having a dilute solution viscosity in toluene of at least about 3.5 dl/g, and in one embodiment, the copolymers will have a dilute solution viscosity of at least about 4.0 dl/g.

The ultra high molecular weight copolymers prepared by the continuous process of the present invention generally will be characterized by an Mw/Mn of at least about 3.5, more often, between about 3.5 and 5.0.

The copolymer compositions of the present invention also may be characterized by their molecular weight distribution. The copolymer compositions contain a large fraction of copolymer having a number average molecular weight of greater than 1,000,000 and a small fraction of copolymer having a number average molecular weight of less than 100,000. In one embodiment of the present invention, the copolymer is characterized as comprising at least about 25%, preferably more than about 35% by weight of a fraction having a number average molecular weight of greater than 1,000,000, and less than about 15%, preferably less than about 10%, by weight of a fraction having a number average molecular weight of less than 100,000.

Unless specifically stated otherwise, the molecular weights reported herein, of the copolymers of the present invention are determined by gel permeation chromatography (GPC) according to techniques well known to those skilled in the art using equipment, software and procedures supplied by Waters Chromatography Division, Millipore Corporation, 34 Maple Street, Milford, Mass. 01757 U.S.A. Determinations are made using organic preparative-grade GPC Styragel (cross-linked polystyrene) columns. Samples of the polymers are dissolved in tetrahydrofuran (THF) stabilized with an antioxidant such as dibutylparacresol and injected into a GPC apparatus equipped with four metal-clad Waters columns. In particular, GPC molecular weight determination with the copolymers of the present invention are made using a Model 200 Waters Gel Permeation Chromatograph retrofitted with a Waters M-45 pump, a R-410 Differential Refractometer, a Hewlett-Packard Electropen Recorder, and a Waters Wisp Injector System. Four Waters Styragel columns are used, all 7.8 mm diameter x 1220 mm long, and packed with Styragel, successively having nominal pore sizes of $10^6$, $10^5$, $10^4$ and $10^3$ Angstroms. Polymer samples (0.20 gram) are placed in a flask with 20 ml. of stabilized THF, stoppered, and allowed to stand overnight to complete solution of the polymer. The samples are then filtered through depth filters of 0.25 micron pore size made of diatomaceous earth-filled cellulose media (Waters P/N 37962) using nitrogen pressure and loaded into the Wisp injector. A 0.7 ml. sample of the THF-polymer solution is selected and a run time of 187 minutes used. The flow rate of THF through the chromatograph is set at 1 ml. per minute, and after equilibrium is obtained, the copolymer sample solutions are injected. Samples are chromatographed at room temperature and detection of the eluted polymer fractions made by refractometer measurements made at 38° C. Overlapping injection at two-hour intervals is used; this is accomplished using two data collection interfaces. The molecular weight separation which is obtained is measured with the Differential Refractometer, and calculations of molecular weight parameters are carried out using computer programs. The software used in these determinations is Waters Expert LC/GPC multi-system software, version 6.2 (Jan. 5, 1988), Waters P/N 87663. Universal Calibration is carried out with narrow distribution polystyrene standards obtained from Pressure Chemical Corporation to generate second and third order calibration curves. Mark-Houwink constants developed for completely soluble linear butadiene-styrene-type polymers (THF) are used to relate the observed data to the reported values. The constants, K and α, are $2.69 \times 10^{-4}$ and 0.73 respectively for Mn and $3.80 \times 10^{-4}$ and 0.70 respectively for Mw. These GPC molecular weight values are estimated to be accurate within 10-20% in absolute sense and more precise on a relative basis. In this manner, Mn, Mw and Mz can be determined. Dispersity is Mw/Mn. The use of the Mark-Houwink equation allows calculation of viscosity average molecular weight (Mv) and intrinsic viscosity.

The dilute solution viscosity (DSV) in toluene of the copolymers of the present invention is determined as follows. The weighed sample of the copolymer is placed in a 4-ounce bottle and the exact weight ($W_1$) is determined. Toluene (100 ml.) is added using a pipet, and the bottle is capped securely. The resulting solution is allowed to stand at room temperature for about 18 hours whereupon the mixture is shaken vigorously and filtered through 802 filter paper. A portion (10 ml.) of the filtrate is pipetted into a tared aluminum pan, and the solvent is evaporated on a hot plate followed by drying in an oven maintained at 105° C. for 10 minutes. The weight of the dried sample is determined, and drying is continued until the residue (liquid copolymer) shows a constant weight ($W_2$). The efflux times of the solvent (toluene) and of the filtered solution (residue) are determined utilizing a 53110/I Schott Gerate Ubbelohde micro viscometer with programmed computer. The viscometer is placed in a constant temperature bath (25° C.) for determination of the efflux times. The programmed computer automatically calculates the DSV and the percent gel of the filtered solution based on the following formulae $$DSV = \frac{\text{Ln(solution flow time/solvent flow time)}}{W_2 \times 10}$$

percent gel = $1 - (W_2 \times 10/W_1) \times 100$.

The intrinsic viscosity ($\eta$) of the copolymers of the present invention is determined by the general procedure utilized for DSV except that the intrinsic viscosity is the average of four data points obtained with four different concentrations.

The glass transition temperature (Tg) of the copolymers of the present invention is determined using a DuPont 1090 thermal analyzer with a 910 Differential Scanning Colorimeter System and following the manufacturer's recommended procedure. The onset, infection and offset temperatures are calculated in accordance with the Interactive DSC Data Analysis-Program V2D.

Figure 2:
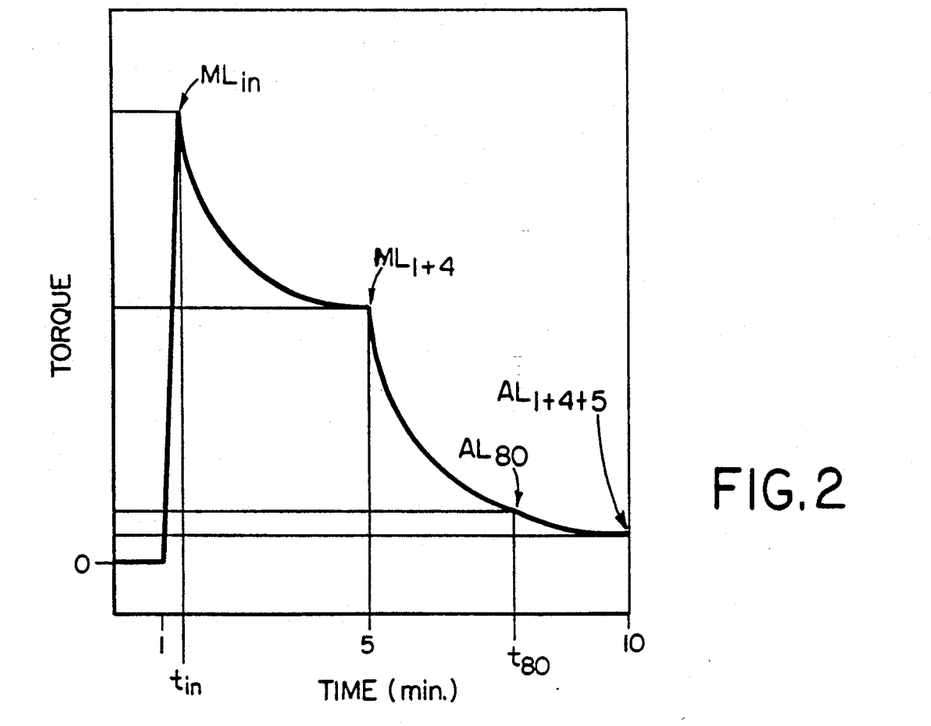
FIG. 2 is a graph of torque versus time identifying the points $ML_{in}$, $ML_{1+4}$, $AL_{80}$ and $AL_{1+4+5}$ for determining percent relaxation of the copolymers of the invention.

The relaxation properties of the copolymers of the present invention are determined using a Bendix Scott STI/200 Mooney Viscometer and a modification of the conventional method for measuring the "shearing viscosity" of rubber and rubber-like materials such as SBR. In this procedure, the sample is placed between the platens which are then closed. The sample is warmed at 100° C. for one minute, and the rotor is turned on. After four minutes, the Mooney value ($ML_{1+4}$) is determined and the rotor is turned off. Measurement of the relaxation is begun, and a relaxation time ($AL_{80}$) is recorded when the torque reaches 20% ($T_{80}$) of the Mooney value $ML_{1+4}$. After a total of 10 minutes, the torque is again observed and recorded as $AL_{1+4+5}$, and the platens are opened. The percent relaxation is calculated as follows:

$$\text{Percent relaxation} = \frac{AL_{1+4+5}}{ML_{1+4}} \times 100$$

A typical graph of the torque versus time for this test procedure is shown in FIG. 2 wherein the various values utilized in computation of percent relaxation such as $ML_{1+4}$ and $AL_{1+4+5}$ are noted. In general, the copolymers of the present invention are characterized by a percent relaxation as defined above of between abot 20% and about 80%, more often from about 30% or even 40% to about 70%.

The following examples illustrate the continuous process of the present invention and the copolymers thus obtained. Unless otherwise indicated in the following examples and elsewhere in the specification and claims, values for number average molecular weight (Mn) and weight average molecular weight for number average molecular weight (Mn) and weight average molecular weight (Mw) are determined in tetrahydrofuran using GPC as described above. The microstructure of the copolymers (e.g., 1,4 units, 1,2 units, etc., is determined utilizing proton NMR in carbon disulfide.

EXAMPLE 1

The continuous polymerization of this example is conducted in a 6.5 gallon stirred tank reactor with a length to diameter ratio of about 3:1. The reactor is equipped in a manner similar to that illustrated in FIG. 1. A purified blend containing 65% of 1,3-butadiene and 35% styrene in hexane (15.0% total solids) is metered continuously into the reactor. Just prior to entering the reactor, a dilute solution of 2,2'-(tetrahydrofuryl) propane in hexane (modifier) is introduced into the monomer stream. The concentration of the modifier in the hexane is 0.005 millimoles/cc (=0.921 gm/100 cc). A solution of the freshly prepared catalyst is described in Example B also is metered continuously into the reactor at a rate to provide 0.0046 gram of active lithium per 100 grams of monomer (PHGM). The continuous polymerization is carried out at a temperature of about 100° C. with a 45 minute residence time. The resulting copolymer solution is continuously withdrawn from the reactor and recovered. A portion of the copolymer solution thus obtained is coagulated with an excess of isopropanol containing about 1% of ditertiary butyl-para-cresol followed by drum drying. The copolymers obtained in 100% yield and is found to have the following characteristics: $[\eta]_{THF}$=4.16; Mn=293,971; Mw=1,101,946; Mw/Mn =3.75; fraction of copolymer having Mn<$10^6$=41% and fraction having Mn<$10^5$=6.7%; Tg −29° C.; $ML_{1+4}$ and $MS_{1+4}$ at 100° C.=>200; $T_{80}$=>300 seconds; microstructure; styrene content 35.9%; block styrene=0%; 1,4 units=34.1%; 1,2 units=30.0%; and 1,2 units (butadiene base)=46.8%.

EXAMPLES 2-6

The general procedure of Example 1 is repeated with the following exceptions which are shown specifically in the following Table I: amount of catalyst; molar ratio of modifier to active lithium; total solids in monomer blend; and ratio of styrene:butadiene in monomer blend. The polymerization conditions and the properties of the copolymers obtained in the examples are also shown in Table I.

TABLE II

| | Examples | | | | |
|---|---|---|---|---|---|
| | 2 | 3 | 4 | 5 | 6 |
| STY./Bd/Hex., Feed | | | | | |
| % Total Solid | 17.0 | 17.0 | 15.5 | 15.5 | 15.0 |
| STY., Wt. % | 30.0 | 30.0 | 30.0 | 35.0 | 35.0 |
| Bd., Wt. % | 70.0 | 70.0 | 70.0 | 65.0 | 65.0 |
| Catalyst | | | | | |
| Active Li* | 0.0059 | 0.0051 | 0.0050 | 0.0046 | 0.0046 |
| Polymerization Conditions | | | | | |
| Modifier/Active Li (moles) | 0.13 | 0.13 | 0.12 | 0.15 | 1.0 |
| Polym. Temp. (°C.) | 117 | 120 | 112 | 105 | 108 |
| Residence Time (Min.) | 45 | 45 | 45 | 45 | 45 |
| % Conversion | 100 | 100 | 100 | 100 | 100 |
| Physical Properties | | | | | |
| $[\eta]_{THF}$ | 2.48 | 2.84 | 3.42 | 4.23 | 4.90 |
| Mw(× $10^{-4}$) | 47.4 | 58.9 | 70.3 | 94.5 | 122.5 |
| Mw/Mn | 2.80 | 3.13 | 2.81 | 4.44 | 4.30 |
| $ML_{1+4}$ @ 100° C. | 105.8 | 149.0 | >200 | >200 | >200 |
| Microstructure | | | | | |
| % 1,2 (Bd Base) | 21.2 | 23.9 | 19.5 | 30.8 | 42.7 |
| % STY. | 30.8 | 30.9 | 30.7 | 34.8 | 35.3 |
| Tg (°C.) | −65.2 | −65.4 | −65.0 | −55.7 | −32.3 |
| Polymer Relaxation | | | | | |
| $T_{80}$ (sec.) | 10.0 | 37.0 | >300 | >300 | >300 |
| % Relaxation | 3.3 | 12.6 | 22.1 | 46.0 | 34.0 |

*gm per 100 grams of monomer; amount varied to account for impurities in monomer blend as determined with Micheler's ketone.

As can be seen from the results in Table I, copolymers having weight average molecular weights (Mw) varying from 474,000 to 1,225,000 can be prepared by the continuous process of the invention; copolymers with high relaxations can be prepared, particularly by the processes of Examples 4-6; and copolymers can be prepared with Mw/Mn ratios of 4.0 and above.

As can be seen from the results reported in Table IV, the relaxation characteristics of the ultra high molecular weight copolymers of this invention are very different from those of the commercial emulsion SBR. Similar differences are observed when the relaxation characteristics are compared to typical commercial solution SBR.

The copolymers prepared by the continuous process of the present invention are useful in a variety of applications such as in the formation of injection moldings, compression moldings, extrusions, film coatings, spray coatings, adhesives, etc. The copolymers also may be blended with various rubbers and elastomers such as natural rubber and synthetic rubbers for obtaining improvements in the physical properties. The polymers, alone or blended with other rubbery polymers, may be mixed with various known compounding agents such as fillers, carbon blacks, processing oils, vulcanizing agents, vulcanizing accelerators, etc. Such vulcanizable compositions can be utilized in tires, tire treads, tire sidewalls, tire belts, fenders, belts, hoses, window frames and other industrial products.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A continuous process for preparing a copolymer of a 1,3-conjugated diene and an aromatic vinyl compound which comprises:
(A) continuously introducing into a reactor, a 1,3-conjugated diene, an aromatic vinyl compound, a hydrocarbon solvent and a polymerization catalyst comprising a trimetalated 1-alkyne wherein the catalyst is obtained by reacting at a temperature of above about 70° C., a 1-alkyne containing at least 4 carbon atoms, an organo metallic compound, R°M and a 1,3-conjugated diene wherein the alkyne is characterized by the formula $$RCH_2C\equiv CH \qquad (II)$$

wherein R is an alkyl group, R° is a hydrocarbyl group, M is an alkali metal, the mole ratio of R°M to 1-alkyne is about 3:1, and the mole ratio of conjugated diene to 1-alkyne is from about 2:1 to about 30:1;
(B) continuously agitating the contents of the reactor while effecting the polymerization reaction to form the copolymer; and
(C) continuously withdrawing the copolymer from the reactor.

2. The process of claim 1 wherein the contents of the reactor are maintained at a temperature of about 30° to about 150° C.

3. The process of claim 1 wherein the conjugated diene and the vinyl aromatic compound are introduced into the reactor as a hydrocarbon solution containing the diene and vinyl aromatic compound.

4. The process of claim 1 wherein the catalyst is introduced into the reactor as a solution of the catalyst in a hydrocarbon solvent.

5. The process of claim 1 wherein the copolymer obtained has a weight average molecular weight of at least about 100,000.

6. The process of claim 1 wherein the copolymer obtained has a weight average molecular weight of at least about 900,000.

7. The process of claim 1 wherein the copolymer obtained comprises from about 50 to about 90% by weight of the conjugated diene and from about 10 to about 50% by weight of the aromatic vinyl compound.

8. The process of claim 1 wherein the copolymer obtained contains at least 20% by weight of bound aromatic vinyl compound.

9. The process of claim 1 wherein the conjugated diene is 1,3-butadiene, isoprene or piperylene.

10. The process of claim 1 wherein the aromatic vinyl compound is a styrene.

11. The process of claim 1 wherein the alkali metal M is lithium.

12. The process of claim 1 wherein R is an alkyl group containing from 1 to about 15 carbon atoms.

13. The process of claim 1 wherein the catalyst is obtained by reacting a 1-alkyne containing at least 4 carbon atoms, an organolithium compound and an aliphatic 1,3-conjugated diene at a temperature of at least 70° C. wherein the mole ratio of organolithium to 1-alkyne is about 3:1 and the mole ratio of conjugated diene to 1-alkyne is from about 3:1 to about 30:1.

14. A continuous process for preparing a copolymer of a styrene compound and a 1,3-conjugated diene selected from the group consisting of 1,3-butadiene, isoprene or piperylene which comprises:
(A) continuously introducing into a reactor, the conjugated diene, the styrene compound, a hydrocarbon solvent and a trimetalated 1-alkyne catalyst which comprises the reaction product of a 1-alkyne containing at least 4 carbon atoms, an organolithium compound and an aliphatic 1,3-conjugated diene at a temperature of at least 70° C. wherein the mole ratio of organolithium to 1-alkyne is about 3:1 and the mole ratio of conjugated diene to 1-alkyne is from about 3:1 to about 30:1;
(B) continuously agitating the contents of the reactor while maintaining the temperature within the reactor between about 75° and 125° C. to form the copolymer;
(C) continuously withdrawing copolymer and hydrocarbon solvent from the reactor; and
(D) recovering the copolymer from the hydrocarbon solvent.

15. The process of claim 14 wherein the contents of the reactor are maintained at a temperature of from 80° C. to 125° C.

16. The process of claim 14 wherein the residence time in the reactor is from about 20 to about 50 minutes.

17. The process of claim 14 wherein the conjugated diene and the vinyl aromatic compound are introduced into the reactor as a hydrocarbon solution containing the diene and the vinyl aromatic compound.

18. The process of claim 14 wherein the catalyst is introduced into the reactor as a solution of the catalyst in a hydrocarbon solvent.

19. The process of claim 14 wherein the conjugated diene is 1,3-butadiene, and the styrene compound is styrene.

20. The process of claim 14 wherein the copolymer obtained has a weight average molecular weight of at least about 900,000.

21. The process of claim 14 wherein the copolymer obtained comprises from about 50 to about 90% by weight of the conjugated diene and from about 10 to about 50% by weight of the styrene compound.

22. The process of claim 14 wherein the amount of catalyst introduced into the reactor is sufficient to provide from about 0.002 to about 0.008 gram of lithium per hundred grams of monomer in the reactor.

* * * * *